Sept. 15, 1959 S. MEURER ET AL 2,904,028
PREHEATING APPARATUS FOR INTERNAL-COMBUSTION ENGINES
Filed June 7, 1956 2 Sheets-Sheet 1
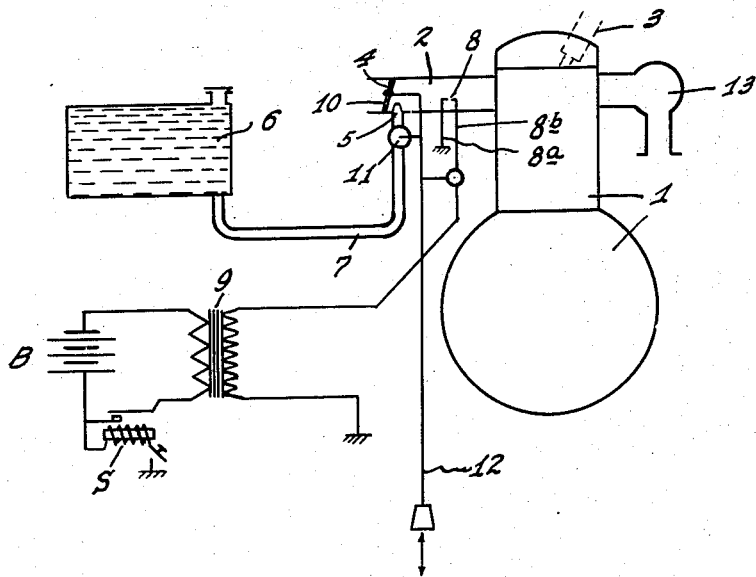
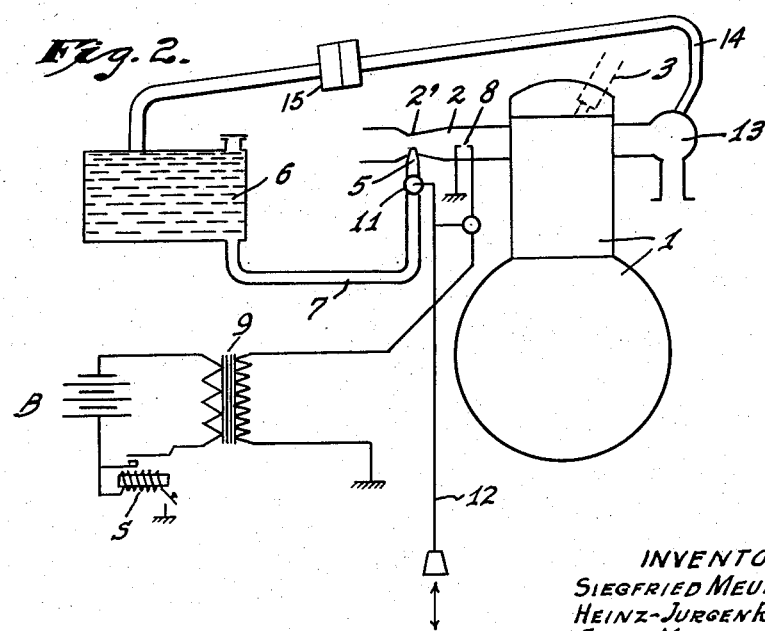
INVENTORS
SIEGFRIED MEURER
HEINZ-JURGEN RAMUNDT
ERICH MERKEL and
BY JULIUS LIEBEL,
ATTORNEYS.

Sept. 15, 1959 S. MEURER ET AL 2,904,028
PREHEATING APPARATUS FOR INTERNAL-COMBUSTION ENGINES
Filed June 7, 1956 2 Sheets-Sheet 2
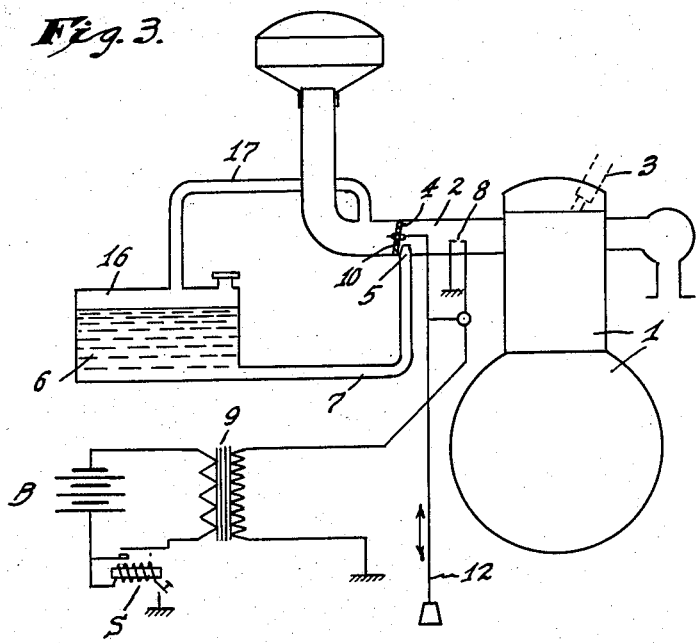
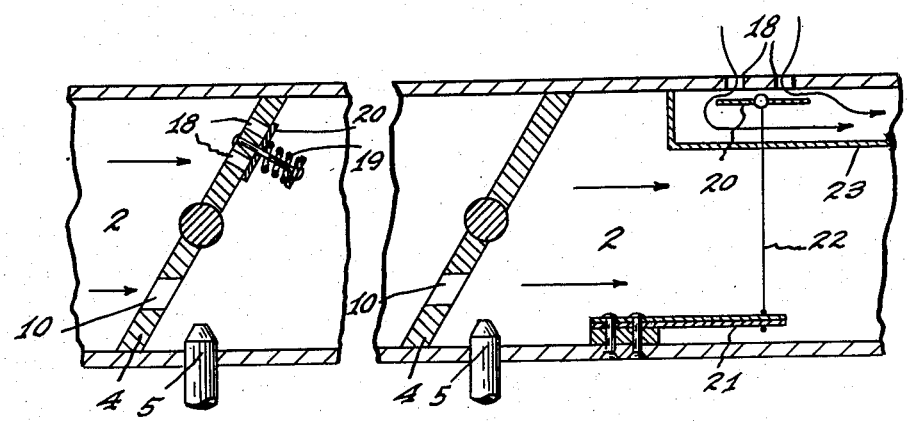
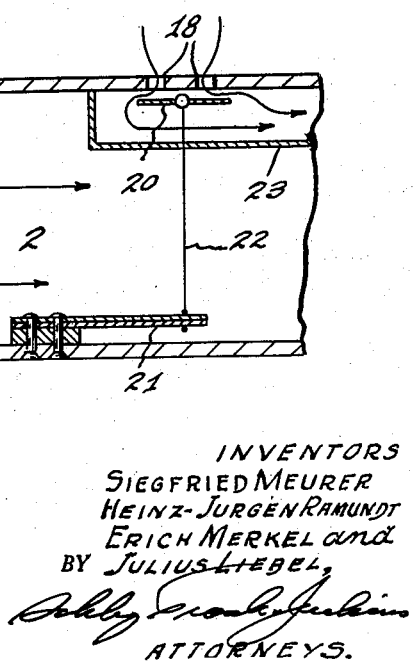
INVENTORS
SIEGFRIED MEURER
HEINZ-JURGEN RAMUNDT
ERICH MERKEL and
BY JULIUS LIEBEL
ATTORNEYS.

United States Patent Office 2,904,028
Patented Sept. 15, 1959

2,904,028

PREHEATING APPARATUS FOR INTERNAL-COMBUSTION ENGINES

Siegfried Meurer, Heinz-Jurgen Ramundt, Erich Merkel, and Julius Liebel, Nurnberg, Germany, assignors to Maschinenfabrik Augsburg-Nurnberg A.G., Nurnberg, Germany Application June 7, 1956, Serial No. 590,032

Claims priority, application Germany June 14, 1955

11 Claims. (Cl. 123—180)

This invention relates to means for facilitating the cold-starting of internal-combustion engines, and more particularly to means for heating the combustion space of the engine with a flame generated in the induction system.

It is an object of the invention to produce a simple and effective means for forming in the induction system of the engine, during cranking of the engine, a combustible mixture of air and fuel and for igniting such mixture and maintaining it ignited until the engine has attained a temperature sufficient to permit its operation in normal manner.

My invention is particularly suited, although not limited, to fuel-injection engines and, for convenience, will be described as embodied in association with such an engine. In carrying out the invention, the induction conduit of the engine is provided with a throttle between which and the engine there are located a fuel nozzle and an igniting device. The throttle is provided with an opening small enough to create a substantial pressure-drop when the throttle is closed and the engine is being cranked, but large enough to pass the air which will be required in the pre-heating mixture. Such opening is so located that the air emerging from it will pass close to the fuel nozzle to form an ignitable mixture with the fuel discharged therefrom, and the igniting device is located beyond the fuel nozzle to initiate combustion of the mixture carried past it.

Means for controlling the supply of fuel to the fuel nozzle of the preheating apparatus, may take different forms. If fuel can flow from the fuel storage tank to the nozzle under the influence of gravity or a constantly applied pressure, the fuel line may include a valve; and in that case, such valve is desirably arranged to be controlled in common with the throttle and the igniting device. In an alternative arrangement, the fuel tank may be located below the outlet of the fuel nozzle and the upper part of the tank connected to the induction conduit at a point therein anterior of the throttle, so that the pressure differential resulting in the induction conduit when the throttle is closed will create flow through the fuel nozzle.

To avoid undue throttling should the throttle not be opened when the engine becomes self-operative, I may provide one or more auxiliary air openings having an associated valve which will be closed during the cranking of the engine but which will open automatically after an appropriate time-delay or when the engine becomes self-operative.

Further objects and features of the invention will become apparent from the following more detailed description and from the accompanying drawings, in which:

Fig. 1 is a diagrammatic illustration showing one embodiment of my invention;

Fig. 2 is a view similar to Fig. 1 illustrating a modified form of means for securing the discharge of fuel into the induction system;

Fig. 3 is another view similar to Fig. 1 but illustrating a further modification of the means for supplying fuel into the induction system;

Fig. 4 is a fragmental axial section, on an enlarged scale, through the induction conduit illustrating one form of means for supplying additional air when the engine becomes self-operative; and Fig. 5 is a view similar to Fig. 4 showing another form of auxiliary-air supply means.

In Fig. 1, we have illustrated an engine 1 having an induction conduit 2 for the admission of air and a fuel-nozzle 3 for the injection of liquid fuel into the combustion space of the engine. The induction conduit 2 is provided with a throttle 4 between which and the engine there is arranged a fuel nozzle 5 connected to a fuel supply tank 6 through a conduit 7. Arranged in the induction conduit 2 posterior to the fuel nozzle 5 is an ignition device 8 shown as comprising a pair of spaced electrodes 8a and 8b connected respectively to the terminals of a high-voltage source 9. The high-voltage source 9, which is capable of creating a spark between the electrodes 8a and 8b within the induction conduit 2, may take any convenient form. As shown, it is a transformer the primary circuit of which contains a battery B and a vibrating interrupter S.

The throttle 4 is provided (see Figs. 4 and 5) with an opening 10 capable of passing air to the engine at a limited rate when the throttle is fully closed. Desirably, the fuel nozzle 5 is located closely posterior to the throttle 4 in the bottom wall of the induction conduit 2 and the opening 10 is located near the lower edge of the throttle so that the air emerging from it will pass closely across the nozzle 5 to mix with the fuel discharged therefrom and from a combustible mixture ignitable by the igniting device 8. Desirably, the diameter of the air opening 10 is about ten times the diameter of the fuel opening in the nozzle 5. These proportions result in the creation of a super-rich mixture which will continue to burn as it passes into the combustion-space of the engine during the cranking thereof.

In Fig. 1, the tank 6, which contains the fuel which is to be discharged from the nozzle 5, is located at such an elevation that fuel may be discharged from the nozzle 5 under the influence of gravity or low vacuum in the conduit 2; and in such case, if the tank contains more fuel than the preheating operation requires, the conduit 7 may be provided with a valve 11 to prevent such fuel-discharge at times when it is not required. The throttle 4, the valve 11, and the igniting device may be controlled jointly by a common control device 12 arranged to effect simultaneously closing of the throttle 4, opening of the valve 11, and actuation of the igniting device.

The apparatus illustrated in Fig. 1 operates in the following manner: When it is desired to crank the engine under conditions such that the engine is too cold to start readily, the control device 12 is operated to close the throttle 4, open the valve 11, and actuate the igniting device 8. When cranking of the engine begins, air is drawn through the opening 10 and mixes with the fuel discharge from the nozzle 5, the resultant mixture flowing through the conduit 2 and being ignited by the igniting device 8. Heat from the resulting combustion warms the engine cylinder or cylinders to a point such that the engine becomes capable of operating in the normal manner. When the engine has been warmed to such temperature, the control device 12 is operated to open the throttle 4, close the valve 11 and deactivate the igniting device.

Fig. 2 illustrates a modified fuel-feeding arrangement in which the throttle, as a means of creating a partial vacuum in the conduit 2, is eliminated and the fuel is fed by pressure imposed on the fuel tank. To this end, the exhaust manifold 13 is connected through a conduit 14 with the upper portion of the fuel tank 6, whereby the pressure in the exhaust manifold will act to promote the discharge of fuel from the nozzle 5. In such an arrangement, it is desirable to include in the conduit 14 a spark and flame arrester 15. It may also be desirable, in order to promote formation of a satisfactory mixture, to provide the induction conduit 2 with a venturi 2' into or near the throat of which the nozzle 5 discharges.

Fig. 3 illustrates still another arrangement for promoting the flow of fuel to the nozzle 5. In this arrangement, the tank 6 is located entirely below the outlet of the nozzle 5 so that fuel will never be discharged from such nozzle under the influence of gravity. In this arrangement, the space 16 above the fuel in the tank 6 is connected through a conduit 17 with the induction conduit 2 at a point therein anterior to the throttle 4. When, during cranking of the engine, the throttle 4 is closed a substantial pressure differential will be created by the restricted orifice 10, the higher pressure being exerted on the tank 6 through the conduit 17 and the lower pressure being effective on the nozzle 5; and as a result of such pressure-differential, fuel will be discharged from the nozzle. In this arrangement when the throttle 4 is open, the pressure differential disappears and no fuel will be discharged from the nozzle 5. Accordingly, the valve 11 in the conduit 7 may be omitted.

To take account of additional air requirements when the engine becomes self-operative, the induction system may be provided with means for admitting auxiliary air even though the throttle 4 remains closed. In Fig. 4, such auxiliary air is supplied through one or more openings 18 in the throttle 4, such openings conveniently being located on the opposite side of the throttle from the opening 10. The openings 18 are covered on the engine side of the throttle by a valve in the form of a disc 20 urged to closed position over the openings 18 by a spring 19. The vacuum in the intake conduit 2 posterior to the throttle tends to open the valve 20; and the spring 19 is so designed as to prevent opening of the valve 20 under the influence of the comparatively low vacuum existing during cranking but to permit the valve 20 to open under the influence of the enhanced vacuum which exists when the engine becomes self-operative.

In Fig. 5 I have illustrated another form of means for supplying auxilary air. In this arrangement, the auxiliary air openings 18 are located in the wall of the conduit 2 posterior to the throttle 4 and the valve 20 is controlled by a temperature-responsive element 21 to which it is connected by a post 22. In this arrangement, the temperature responsive element 21, shown as a bimetal strip, maintains the valve 20 closed under low-temperature conditions; but under the influence of heat from the burning gases in the conduit 2, the temperature-responsive element 21 gradually warms up and moves the valve 20 downwardly to uncover the openings 18 and permit the admission of auxiliary air. To prevent the air thus admitted to the intake conduit from cooling the temperature-responsive element and perhaps causing an undesired closing of the valve 20, we may provide the intake conduit with a shield or baffle 23 which deflects toward the engine air entering the openings 18 and prevents such air from exerting a cooling effect on the temperature-responsive element 21. The device of Fig. 5 is preferably arranged to open the valve 20 about ten seconds after the preheater has been placed in operation and cranking of the engine started.

Instead of merely opening an auxiliary air orifice at the conclusion of the preheating, the automatic mechanism, such as the pressure-responsive spring 19 of Fig. 4 or the temperature-responsive element 21 of Fig. 5, may be arranged to actuate the control 12 to render the whole preheating mechanism inoperative after the lapse of a predetermined time or in response to conditions which change when the engine becomes self-operative.

We claim as our invention:

1. In combination with an internal combustion engine having an induction conduit, preheating means comprising a fuel-nozzle having an orifice arranged to discharge into said conduit, an adjustably positionable throttle located in said conduit anterior to said nozzle, and an igniting means located in said conduit posterior to said nozzle, said throttle having an opening so disposed therein that air flowing through said opening when the throttle is closed and the engine being cranked will pass close to said nozzle to form a combustible mixture with the fuel discharged from said nozzle.

2. The invention of claim 1 with the addition that the diameter of said opening is about ten times that of the fuel nozzle orifice.

3. The invention of claim 1 with the addition of a valve for controlling the flow of fuel to said nozzle.

4. The invention of claim 3 with the addition of a common control for said valve, throttle, and igniting device.

5. The invention of claim 3 with the addition of a common control for said valve and igniting device.

6. The invention of claim 3 with the addition of a common control for said throttle and igniting device.

7. The invention of claim 1 with the addition of a closed fuel tank connected to said nozzle, said fuel tank being located below the outlet of said nozzle, and a conduit connecting the upper portion of said fuel tank with a point in said induction conduit anterior to the throttle.

8. The invention of claim 1 with the addition that said induction conduit is provided with an auxiliary air orifice opening into the induction conduit posterior to said throttle, and a valve for controlling flow through said orifice.

9. The invention of claim 8 with the addition that said valve means opens inwardly with respect to said induction conduit, and spring means opposing opening of said valve with a predetermined force.

10. The invention of claim 8 with the addition of means responsive to heat generated by combustion of said mixture for controlling said valve.

11. The invention of claim 1 with the addition that said throttle is provided with a second opening, and a valve carried by the throttle for controlling flow of air through said second opening.

References Cited in the file of this patent
UNITED STATES PATENTS

| | | |
|---|---|---|
| 1,226,191 | Creamer | May 15, 1917 |
| 1,386,038 | West et al. | Aug. 2, 1921 |
| 1,431,910 | Good | Oct. 10, 1922 |
| 1,679,521 | Good | Aug. 7, 1928 |
| 1,982,866 | Guziel et al. | Dec. 4, 1934 |
| 2,034,855 | Alby | Mar. 24, 1936 |
| 2,044,113 | Woolson | June 16, 1936 |
| 2,229,714 | Wirrer | Jan. 28, 1941 |